US009332237B2

(12) United States Patent
Shinha et al.

(10) Patent No.: US 9,332,237 B2
(45) Date of Patent: May 3, 2016

(54) PROJECTOR AND METHOD OF CONTROLLING PROJECTOR

(71) Applicant: SEIKO EPSON CORPORATION, Tokyo (JP)

(72) Inventors: Hiroaki Shinha, Matsukawa-mura (JP); Koichi Miyasaka, Matsumoto (JP); Hirofumi Kasuga, Matsumoto (JP); Tadashi Kinebuchi, Okaya (JP); Shuji Narimatsu, Suwa (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/333,865

(22) Filed: Jul. 17, 2014

(65) Prior Publication Data

US 2015/0022788 A1 Jan. 22, 2015

(30) Foreign Application Priority Data

Jul. 22, 2013 (JP) .................................. 2013-151384

(51) Int. Cl.
*G03B 21/20* (2006.01)
*H04N 9/31* (2006.01)
*G03B 33/06* (2006.01)

(52) U.S. Cl.
CPC ........... *H04N 9/3173* (2013.01); *H04N 9/3111* (2013.01); *G03B 21/206* (2013.01); *G03B 21/2033* (2013.01); *G03B 21/2053* (2013.01); *G03B 33/06* (2013.01); *H04N 9/3155* (2013.01)

(58) Field of Classification Search
CPC .. G03B 21/20; G03B 21/2053; G03B 21/206; G03B 21/2093; G03B 21/26; G03B 21/28; H04N 9/3155; H04N 9/315; G02B 5/02; G02B 5/0273; G02B 5/0278
USPC ...................................... 353/121, 122, 85, 82
See application file for complete search history.

(56) References Cited

U.S. PATENT DOCUMENTS

| 2005/0128437 A1* | 6/2005 | Pingali et al. ................... 353/69 |
| 2006/0203212 A1* | 9/2006 | Held ........................ F21S 6/006 353/119 |
| 2008/0036977 A1* | 2/2008 | Sugita et al. .................... 353/82 |
| 2009/0310087 A1* | 12/2009 | Itoh et al. ......................... 353/38 |
| 2013/0057601 A1 | 3/2013 | Kondo et al. |

FOREIGN PATENT DOCUMENTS

| JP | 08163476 A * | 6/1996 |
| JP | A-2005-99588 | 4/2005 |
| JP | A-2006-227143 | 8/2006 |
| JP | A-2013-54093 | 3/2013 |

\* cited by examiner

*Primary Examiner* — William C Dowling
*Assistant Examiner* — Ryan Howard
(74) *Attorney, Agent, or Firm* — Oliff PLC (57) ABSTRACT

A projector includes a projection section adapted to project light, a human detection section adapted to detect a human existing in a predetermined region, and a mode switching section adapted to switch an operation mode to one of a content mode for projecting light of an image related to a content by the projection section, and an illumination mode for projecting light for illumination by the projection section in accordance with a detection result of the human detection section.

9 Claims, 6 Drawing Sheets

PROJECTOR AND METHOD OF CONTROLLING PROJECTOR

The entire disclosure of Japanese Patent Application No. 2013-151384, filed Jul. 22, 2013 is expressly incorporated by reference herein.

BACKGROUND

1. Technical Field

The present invention relates to a projector having a projection section for projecting light, and a method of controlling a projector.

2. Related Art

In the past, there has been known a projector for projecting light to project an image (see, e.g., JP-A-2013-54093).

It is assumed that the projector described above is made to function as an illumination device using the feature of projecting light. In this case, if an appropriate process using the fact that the projector is made to function as the illumination device can be performed, improvement in the satisfaction level of the user using the projector, and improvement inconvenience thereof can be achieved.

SUMMARY

An advantage of some aspects of the invention is to provide a projector and a method of controlling a projector each capable of executing a process using the fact that the projector is made to function as an illumination device.

An aspect of the invention is directed to a projector including a projection section adapted to project light, a human detection section adapted to detect a human existing in a predetermined region, and a mode switching section adapted to switch an operation mode to one of a content mode for projecting light of an image related to a content by the projection section, and an illumination mode for projecting light for illumination by the projection section in accordance with a detection result of the human detection section.

Here, whether it is more advantageous to make the projector project an image related to a content or it is more advantageous to make the projector function as an illumination device is different by whether or not a human exists in a predetermined region. For example, in the case in which no human exists in the region where the image related to the content projected by the projector can visually be recognized, it is more advantageous to make the projector function as the illumination device.

In light of the above, accordance to the configuration described above, the projector switches the operation mode to either one of the content mode and the illumination mode in accordance with whether or not a human exists in a predetermined region. Thus, the appropriate process considering an application of making the projector function as the illumination device becomes possible.

In another aspect of the invention, the mode switching section switches the operation mode to the content mode in a case in which a human is detected by the human detection section, and switches the operation mode to the illumination mode in a case in which no human is detected.

According to this configuration, it becomes possible for the projector to project the image related to the content only in the case in which a human exists in the predetermined region, and thus it is possible to inhibit the image related to the content from being unnecessarily projected.

In still another aspect of the invention, the predetermined region is a region defined based on visibility of an image to be projected using the light projected in a case in which the operation mode is the content mode.

According to this configuration, since the operation mode is switched to the content mode in the case in which a human exists in the region where the image related to the content projected can visually be recognized, it is possible to inhibit the image related to the content from being unnecessarily projected.

In yet another aspect of the invention, the human detection section is capable of detecting a human existing in the region with respect to each of a plurality of regions, and the mode switching section switches the operation mode to one of the content mode and the illumination mode in accordance with a relationship between states of whether or not a human exists in the respective regions.

According to this configuration, since the projector switches the operation mode in accordance with the relationship between the states of whether or not a human exists in the respective regions, more correct switching in the operation mode in accordance with the relationship between the regions and humans can be performed.

Still yet another aspect of the invention, a first region included in the plurality of regions is a region defined based on visibility of an image to be projected using the light projected in a case in which the operation mode is the content mode, a second region included in the plurality of regions is a region defined based on availability of the projected light as illumination in a case in which the operation mode is the illumination mode, and the mode switching section switches the operation mode to the content mode in a case in which the human detection section has detected that a human exists in the first region, and switches the operation mode to the illumination mode in a case in which the human detection section has failed to detect that a human exists in the first region, and has detected that a human exists in the second region.

According to this configuration, it is possible to appropriately switch the operation mode in accordance with whether or not a human exists in the region where the image related to the content projected thereon can visually be recognized. Further, in the case in which no human exists in the region where the image related to the content thus projected can visually be recognized, the operation mode can appropriately be switched in accordance with whether or not a human exists in the region where the light projected by the projector can be used as illumination.

In further another aspect of the invention, the projection of the light by the projection section is stopped unless it is detected that a human exists in at least one of the first region and the second region.

According to this configuration, since the projection of the light is stopped in the case in which no human exists in the region where the image related to the content thus projected can visually be recognized, and at the same time, no human exists in the region where the light projected by the projector can be used as illumination, the light projection can be inhibited from being unnecessarily performed, and thus the energy saving can be realized.

In still further another aspect of the invention, the projector further includes a light source, and a light diffusion device disposed on a light path from the light source, the light from the light source is transmitted without being diffused by the light diffusion device in a case in which the operation mode is the content mode, and the light from the light source is transmitted while being diffused by the light diffusion device in a case in which the operation mode is the illumination mode.

According to this configuration, in the case in which the operation mode is the illumination mode, it is possible to project the light suitable for the illumination light using the light diffusion device.

Yet further another aspect of the invention is directed to a method of controlling a projector including a projection section adapted to project light, the method including: detecting a human existing in a predetermined region, and switching an operation mode to one of a content mode for projecting light of an image related to a content by the projection section, and an illumination mode for projecting light for illumination by the projection section in accordance with a detection result in the detecting.

Here, whether it is more advantageous to make the projector project an image related to a content or it is more advantageous to make the projector function as an illumination device is different by whether or not a human exists in a predetermined region. For example, in the case in which no human exists in the region where the image related to the content projected by the projector can visually be recognized, it is more advantageous to make the projector function as the illumination device.

In light of the above, accordance to the control method described above, the projector switches the operation mode to either one of the content mode and the illumination mode in accordance with whether or not a human exists in a predetermined region. Thus, the appropriate process considering an application of making the projector function as the illumination device becomes possible.

According to the aspects of the invention, there is obtained an advantage that the process using the application of making the projector function as the illumination device can be performed.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, an embodiment of the invention will be described with reference to the accompanying drawings.

Figure 1A:
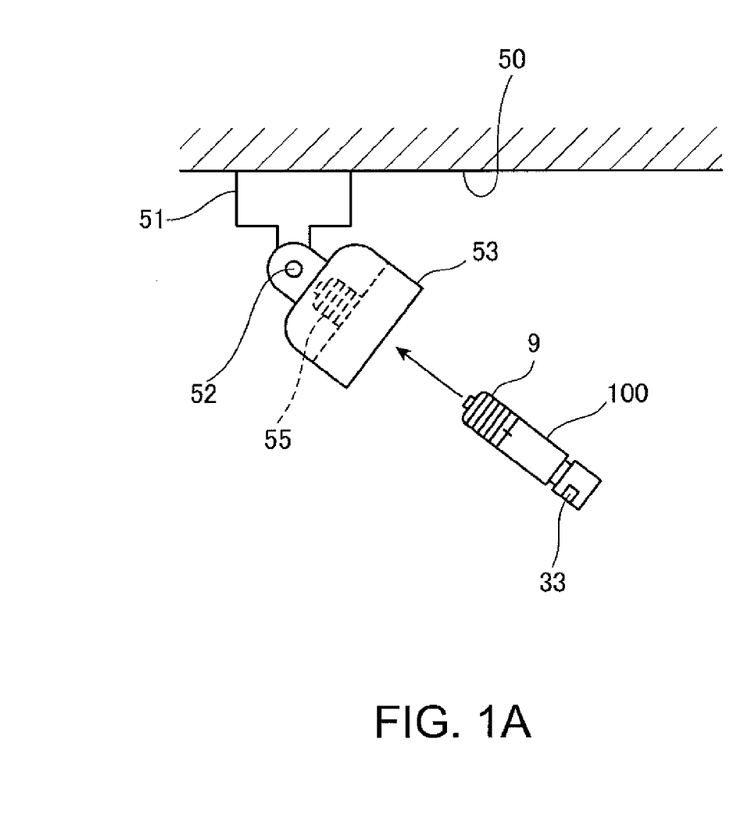
FIGS. 1A and 1B are diagrams each showing a usage pattern of a projector according to an embodiment of the invention.
Figure 1B:
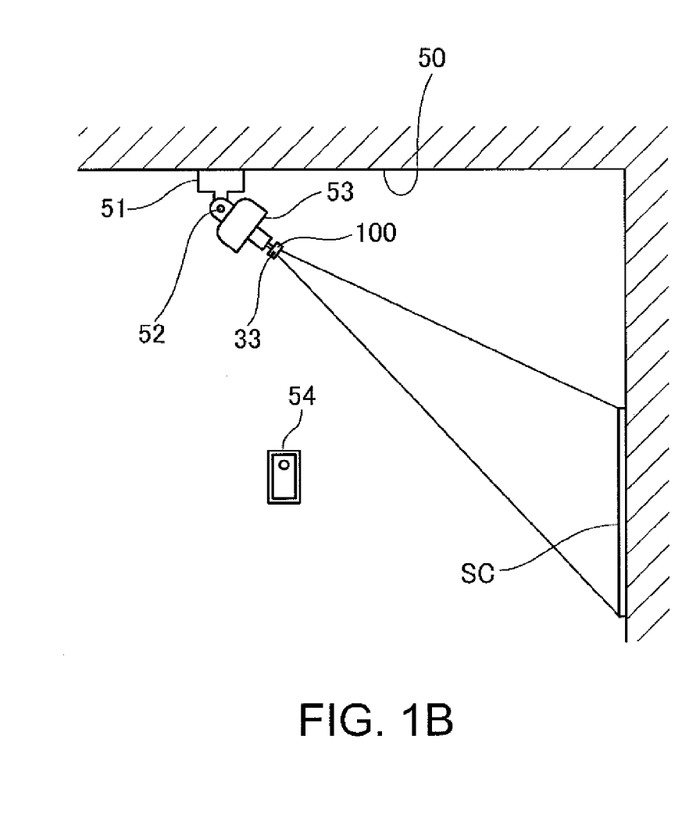

FIGS. 1A and 1B are diagrams each showing a usage pattern of the projector 100 according to the present embodiment.

The projector 100 is a projection type projector attached to the ceiling of a room such as a restaurant, a classroom, or an office, and projecting image light from the mounting position to project an image on a screen SC.

In a detailed explanation, as shown in FIGS. 1A and 1B, a fixation section 51 is fixed to the ceiling 50 at a predetermined position, and an attachment cover 53 is attached to the fixation section 51 rotatably around an axis 52.

As shown in FIG. 1A, inside the attachment cover 53, there is disposed a power feed terminal 55 supplied with electricity from a power supply line not shown. The power supply to the power feed terminal 55 can be switched ON/OFF using a switch 54 (FIG. 1B) provided to a wall of the room.

The power feed terminal 55 is a lamp-base socket having an internal-thread shape. An end portion of the projector 100 is provided with an incoming terminal 9 having an external-thread shape, and by screwing the incoming terminal 9 to the power feed terminal 55, the terminals are physically (mechanically) and electrically connected to each other. Due to the connection of these terminals, there is achieved a state in which the power can be supplied to the projector 100.

As shown in FIG. 1B, the projector 100 projects the image light to the screen SC disposed on the wall of the room to project the image based on the image light on the screen SC.

It should be noted that the usage patterns of the projector 100 shown in FIGS. 1A and 1B are illustrative only. For example, the projector 100 can also be attached to the wall or the floor instead of the ceiling, or can also be attached to a dedicated track. Further, the projector 100 can be installed not only indoors but also outdoors.

Further, the incoming terminal 9 is not limited to the terminal having the external-thread shape. For example, it is also possible to adopt a plug type terminal connected to the power receptacle, or a terminal having a predetermined shape to be electrically connected to a power line on an illumination duct. In other words, it is sufficient for the incoming terminal 9 to be a terminal supplied with electricity irrespective of the shape and the connection configuration to the power feed terminal.

Figure 2:
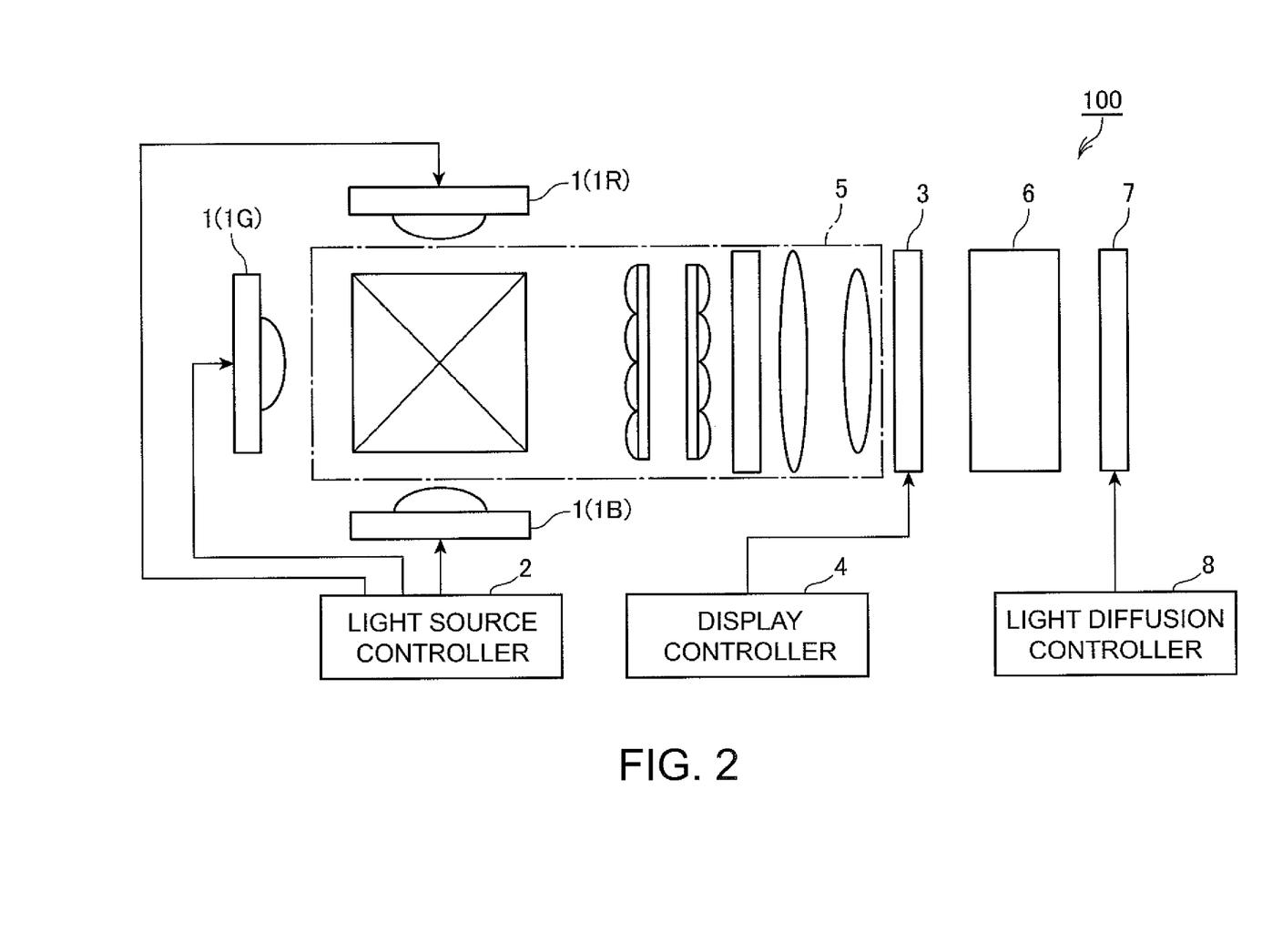
FIG. 2 is a diagram showing a configuration of the projector.

FIG. 2 is a diagram showing a configuration of the projector 100 according to the present embodiment.

As shown in FIG. 2, the projector 100 is provided with light sources 1, a light source controller 2 for driving the light sources 1, a spatial light modulation device 3 for modulating the light from the light sources 1, a display controller 4 for writing an image into the spatial light modulation device 3, an irradiation optical system 5 disposed so that the spatial light modulation device 3 is irradiated with the light from the light sources 1, a projection optical system 6 for projecting the light modulated by the spatial light modulation device 3, a light diffusion device 7 for controlling the diffusion level of the light from the projection optical system 6, and a light diffusion controller 8 for controlling the light diffusion device 7.

In the present embodiment, the light sources 1, the spatial light modulation device 3, the irradiation optical system 5, and the projection optical system 6 function as a "projection section" in cooperation with each other.

The light sources 1 are respectively provided with an LED corresponding to red light (R), an LED corresponding to green light (G), and an LED corresponding to blue light (B). The red light (R), the green light (G), and the blue light (B) are an example of a typical combination of element colors for displaying a full-color image. Therefore, although the light sources 1 of the present embodiment include the LEDs corresponding respectively to the three different element colors, the light sources 1 can also include LEDs corresponding respectively to four or more different element colors, or can also include LEDs corresponding respectively to two different element colors in other embodiments. Further, instead of the LEDs, the light sources 1 can also include organic or inorganic semiconductor laser elements or organic electroluminescent (EL) elements, or can further include a fluorescent substance using the LEDs or the laser elements as excitation light sources.

The irradiation optical system 5 is provided with a dichroic prism for combining the light paths of the light (light beams) respectively from the R, G, and B light sources 1R, 1G, and 1B, an integrator including a fly-eye lens, and a polarization conversion element for uniformizing the polarization of the light from the integrator.

The spatial light modulation device 3 is a single panel transmissive liquid crystal light valve. The liquid crystal light valve of the present embodiment includes a pair of polarization plates and a liquid crystal panel located between the pair of polarization plates. As described later in detail, the R, G, and B light sources 1R, 1G, and 1B, and the spatial light modulation device 3 are driven using an RGB sequential method, namely a color sequential method. Further, due to this process, the projector 100 can project the full-color illumination or image.

The light diffusion device 7 is located on the light path of the light projected by the projection optical system 6. The light diffusion device 7 includes a transmissive reverse-mode PDLC device. PDLC denotes a polymer-dispersed liquid crystal. Although not shown in the drawings, the reverse-mode PDLC device includes a pair of light transmissive electrodes, and a reverse-mode PDLC layer disposed between the pair of electrodes.

In the case in which no potential difference exists between the pair of electrodes, the reverse-mode PDLC layer exhibits a light transmissive property, and as a result, the light passes through the light diffusion device 7 without being substantially diffused. It is expressed that the light diffusion device 7 is in a nondiffusive state on this occasion.

In contrast, in the case in which a predetermined potential difference is provided between the pair of electrodes, the reverse-mode PDLC layer exhibits a light diffusive property, and as a result, the light is diffused while passing through the light diffusion device 7. It is expressed that the light diffusion device 7 is in a diffusive state on this occasion.

Further, in the case in which the potential difference provided between the pair of electrodes is in an intermediate level between zero and the predetermined potential difference, the reverse-mode PDLC layer exhibits an intermediate light diffusive property corresponding to the potential difference, and as a result, the light is moderately diffused while passing through the light diffusion device 7. It is expressed that the light diffusion device 7 is in an intermediate diffusive state on this occasion.

As described above, the light diffusion device 7 can control the diffusion level of the image or the illumination projected by the projector 100.

The transparency obtained when the reverse-mode PDLC layer exhibits the light transmissive property is higher than the transparency obtained when a normal PDLC layer exhibits the light transmissive property. This is one of the advantages of the light diffusion device 7 provided with the reverse-mode PDLC layer (or the reverse-mode PDLC device). It should be noted that the term "PDLC" is defined so as to include both of the "reverse-mode PDLC" and the normal "PDLC."

Figure 3:
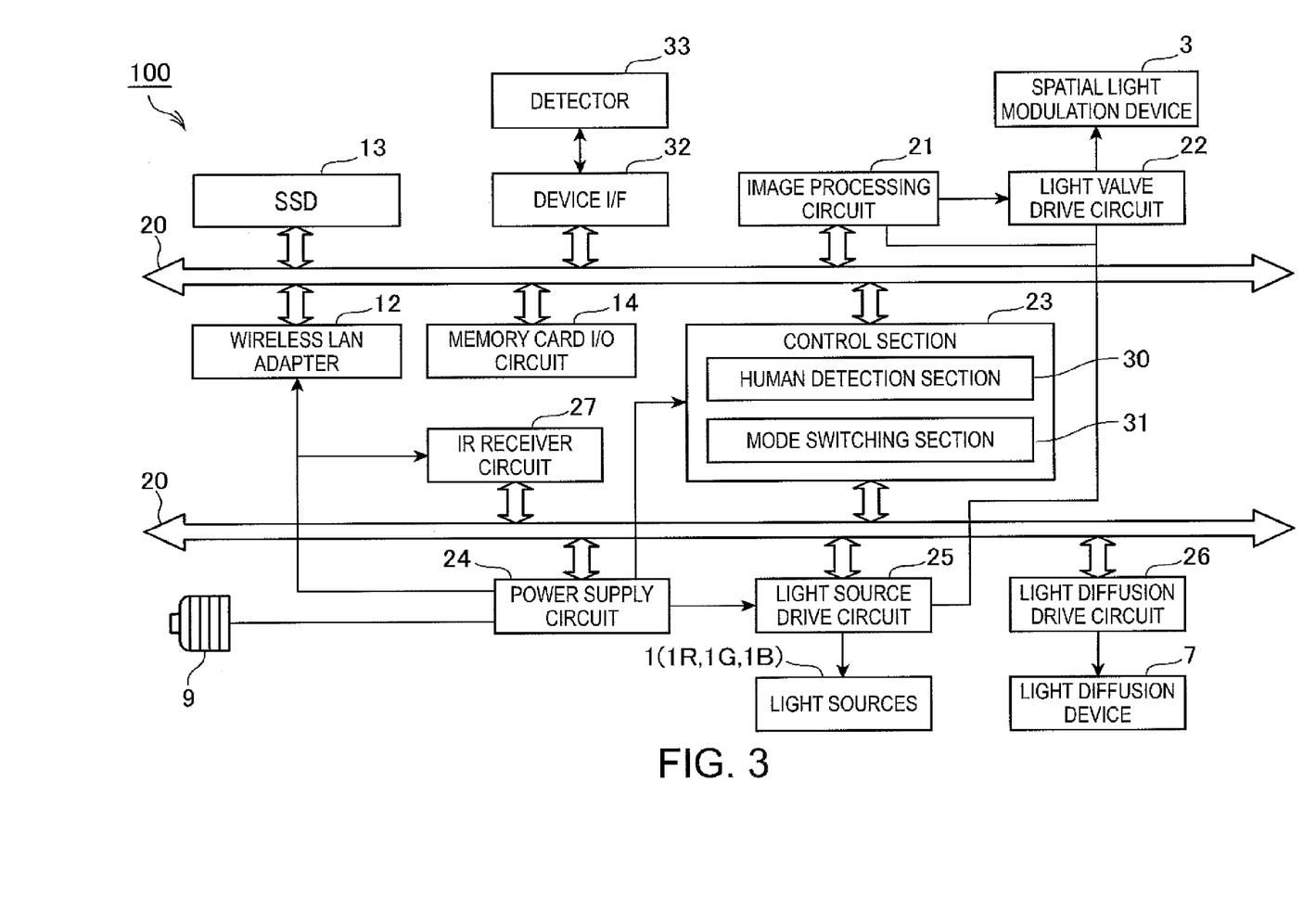
FIG. 3 is a block diagram showing a functional configuration of the projector.

FIG. 3 is a block diagram showing a functional configuration of the projector 100.

As shown in FIG. 3, the projector 100 is provided with the incoming terminal 9, a power supply circuit 24, and a control section 23.

The incoming terminal 9 receives the electricity for the projector 100 to function from an external power supply via the power feed terminal, and then outputs the electricity to the power supply circuit 24. The electricity supplied to the incoming terminal 9 can be alternating-current or direct-current. The power supply circuit 24 supplies each section of the projector 100 with the electricity.

The control section 23 is provided with a CPU, a ROM, a RAM, a nonvolatile memory, a system controller, and other circuits, and controls each section of the projector 100. The nonvolatile memory stores operating software for realizing the function described later and application software, and the ROM stores BIOS.

The control section 23 is provided with a human detection section 30 and a mode switching section 31 as function blocks, which will be described later.

Further, as shown in FIG. 3, a wireless LAN adapter 12, a solid-state drive (SSD) 13, a memory card input/output (I/O) circuit 14, an image processing circuit 21, a light valve drive circuit 22, a power supply circuit 24, a light source drive circuit 25, a light diffusion drive circuit 26, an IR receiver circuit 27, and a device I/F 32 are connected to the control section 23 via a bus 20.

The wireless LAN adapter 12 communicates in conformity to a communication standard of the wireless LAN under the control of the control section 23. The projector 100 communicates with a server computer, a personal computer, a smartphone, a tablet computer, and so on externally located and not shown using the wireless LAN adapter 12, and can project an image based on data stored in these devices.

The SSD 13 is configured including a flash memory as a nonvolatile memory, and a flash drive for reading and writing the flash memory, and stores a variety of types of data in a nonvolatile and rewritable manner under the control of the control section 23.

The memory card I/O circuit 14 reads and writes the memory card inserted in a dedicated card slot under the control of the control section 23.

Content data (described later) related to the image to be projected by the projector 100 can be stored in the flash memory related to the SSD 13 and the memory card related to the memory card I/O circuit 14. Further, the content data related to the image stored can be rewritten via an external network using the communication performed via the wireless LAN adapter 12.

It should be noted that in the present embodiment, the term "image" is defined as a term including a still image and a moving image. The still image includes an image varying with time such as a slide show.

Further, in the present embodiment, the content denotes a series of still images with unity or moving image such as a movie, a music video, or a slide show for a presentation. In the case in which a signal is input from an external device, a still image (e.g., a still image showing a desktop) and a moving image thus input also correspond to the content.

Further, the content data is the data in a predetermined file format such as a JPEG file or an MPEG file, and is the data to be an original data when projecting an image (a still image, a moving image) related to the content.

Further, the image related to the content is an image to be projected on the screen SC when the image light is projected based on the content data or the signal from the outside.

The image processing circuit 21 performs a resolution conversion, and further a color correction and a keystone distortion correction on the source image, and then outputs the result to the light valve drive circuit 22 under the control of the control section 23. The light valve drive circuit 22 outputs a drive signal to the spatial light modulation device 3 based on the input from the image processing circuit 21 to make the spatial light modulation device 3 modulate the light. The control section 23, the image processing circuit 21, and the light valve drive circuit 22 function as a display controller 4 in cooperation with each other.

The light source drive circuit 25 outputs the drive signal to the R, G, and B light sources 1R, 1G, and 1B under the control of the control section 23 to drive these light sources. The control section 23 and the light source drive circuit 25 function as a light source controller 2 in cooperation with each other.

The light diffusion drive circuit 26 outputs a drive signal to the light diffusion device 7 under the control of the control section 23 to set the light diffusion device 7 to either one of the nondiffusive state, the diffusive state, and the intermediate diffusive state described above. The control section 23 and the light diffusion drive circuit 26 function as a light diffusion controller 8 in cooperation with each other.

A device is connected to the device I/F 32, and the communication with the device is performed in conformity to a predetermined protocol under the control of the control section 23. In the present embodiment, a detector 33 is connected to the device I/F 32.

Hereinafter, the detector 33 and the human detection section 30 provided to the control section 23 will be explained.

The human detection section 30 detects whether or not a human exists in the first region A1 and whether or not a human exists in the second region A2 based on the input from the detector 33.

Figure 4:
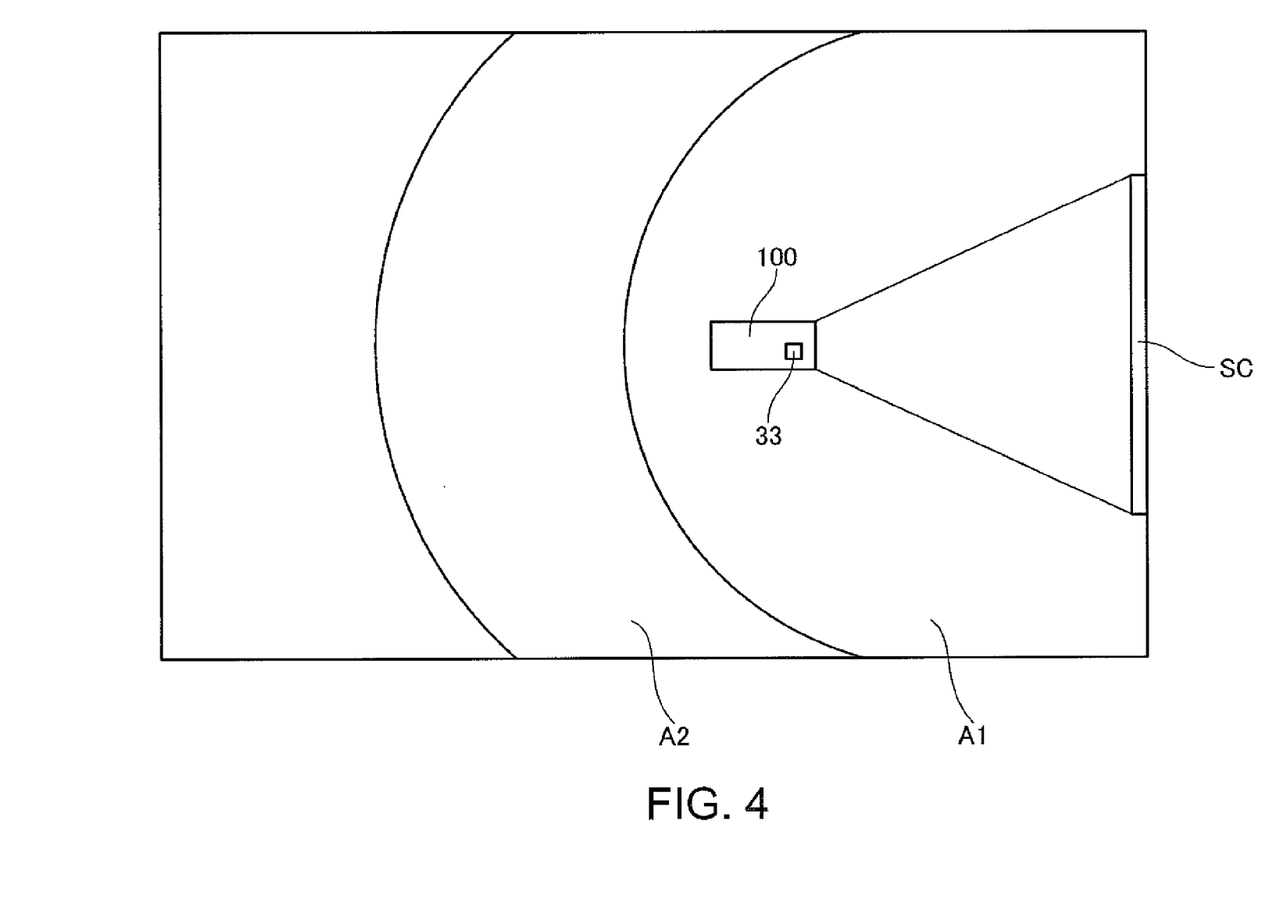
FIG. 4 is a diagram schematically showing a first region and a second region.

The first region A1 denotes a region defined based on viewability of an image to be projected with the light projected by the projector 100 in a content mode described later. In other words, the first region A1 is a region where a human existing in the first area A1 is assumed to be able to visually recognize the image projected on the screen SC.

The second region A2 denotes a region defined based on availability of the light projected as the illumination in an illumination mode described later. As described later, although in the illumination mode, the light for illumination is projected, the range irradiated with the light for illumination, and the range, where the human can recognize the light for illumination as the light, correspond to the second region A2.

FIG. 4 is a diagram obtained by schematically describing the first region A1 and the second region A2 in a form suitable for the explanation in a diagram of the room, to which the projector 100 is installed, viewed from above.

In the example shown in FIG. 4, the first region A1 is a region corresponding to a range of a predetermined distance centered on the screen SC, and the second region A2 is a region corresponding to a range of a longer distance than the predetermined distance described above centered on the screen SC. As described above, the first region A1 and the second region A2 are each not required to be a strictly defined region. It is sufficient for the first region A1 to be a region where there is a possibility of visually recognizing the image projected on the screen SC, and it is sufficient for the second region A2 to be a region where there is a possibility of using the light thus projected as the illumination.

Hereinafter, the detector 33 and the human detection section 30 will be explained citing a specific example.

The function of the human detection section 30 explained hereinafter is realized by hardware and software in cooperation with each other such as a CPU reading and then executing a program.

For example, the detector 33 is a camera device. The camera device is installed in a room provided with the projector 100 at a position where at least the first region A1 and the second region A2 can be shot.

The human detection section 30 controls the camera device to perform shooting at predetermined intervals to generate shot image data, and then obtains the shot image data. The human detection section 30 detects whether or not a human exists in the first region A1 and whether or not a human exists in the second region A2 based on the shot image data thus obtained.

For example, the human detection section 30 develops the shot image data in a coordinate system defined in a predetermined storage area, and then detects whether or not an image of a human face exists in the image based on the shot image data using a method such as an existing pattern matching method. In the case in which a human exists, the human detection section 30 estimates the position of the human relative to the camera device in accordance with the position of the data representing the human face in the shot image data, the size of the data, the field angle and the orientation of the camera device, and so on. Here, the positional relationships between the camera device, and the range of the first region A1 and the range of the second region A2 are previously set, and the human detection section 30 detects whether or not a human exists in the first region A1 and whether or not a human exists in the second region A2 based on the configuration related to the positional relationships and the position of the human relative to the camera device thus estimated.

Further, for example, the detector 33 is a camera device provided with an automatic focus function. The camera device is installed in a room provided with the projector 100 at a position where at least the first region A1 and the second region A2 can be shot.

The human detection section 30 controls the camera device to perform shooting at predetermined intervals to generate shot image data, and then obtains the shot image data. Subsequently, the human detection section 30 determines whether or not a human exists in a shooting range based on the shot image data. In the case in which a human exists, the human detection section 30 performs measurement of the distance using the automatic focus function of the camera device to estimate the position of the human relative to the camera device in accordance with the position of the data of the human image in the shot image data. After the estimation, whether or not a human exists in the first region A1 and whether or not a human exists in the second region A2 are detected using the method described above.

Further, for example, the detector 33 is a device for irradiating each of the first region A1 and the second region A2 with an infrared ray, an ultrasonic wave, and so on to detect the reflected wave, and then outputting the detected value to the human detection section 30. The human detection section 30 detects whether or not a human exists in the first region A1 and whether or not a human exists in the second region A2 based on an input from the device using the existing method.

Further, for example, the detector 33 is a weight sensor, a strain gauge, or a vibration sensor disposed on the floor (e.g., the back of a carpet) in each of the first region A1 and the second region A2. The human detection section 30 detects whether or not a human exists in the first region A1 and whether or not a human exists in the second region A2 by detecting the motion of the human based on the detected value of the sensor.

Although the configurations of the detector 33 and the human detection section 30 have been explained hereinabove citing the examples, the configurations of the detector 33 and the human detection section 30 are not limited to those described as the examples. In other words, any configuration can be adopted providing whether or not a human exists in the first region A1 and whether or not a human exists in the second region A2 can be detected.

Then, a drive method of the R, G, and B light sources 1R, 1G, and 1B will be explained.

As operation modes related to the drive of the R, G, and B light sources 1R, 1G, and 1B, there are two modes, namely the normal mode and the high-speed mode.

Each of the modes will hereinafter be explained using FIGS. 5A and 5B.

Figure 5A:
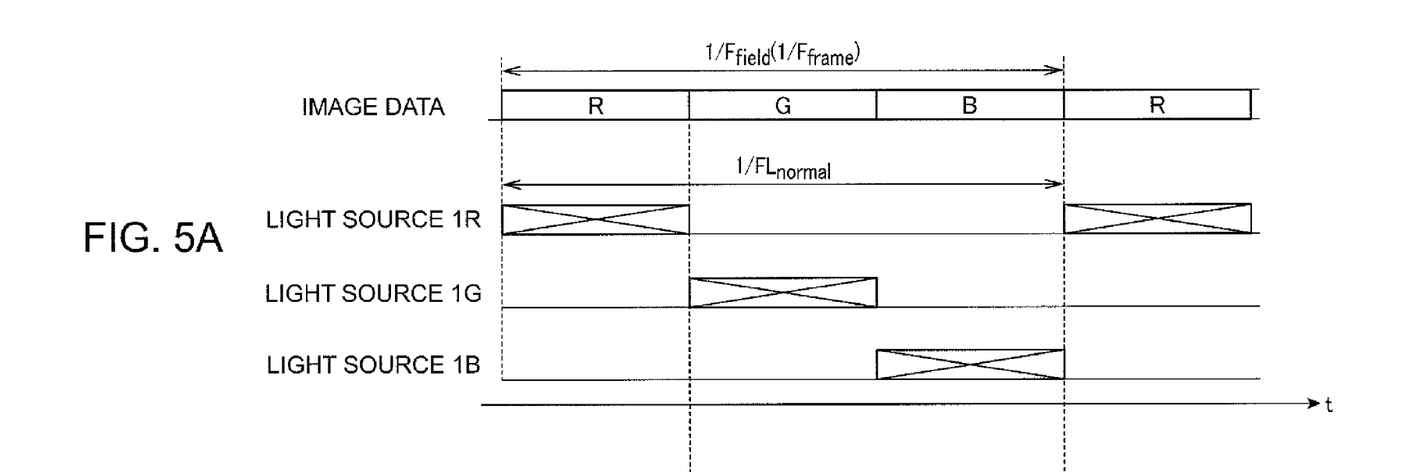
FIG. 5A is a diagram for explaining a normal mode as one of light source drive modes.
Figure 5B:
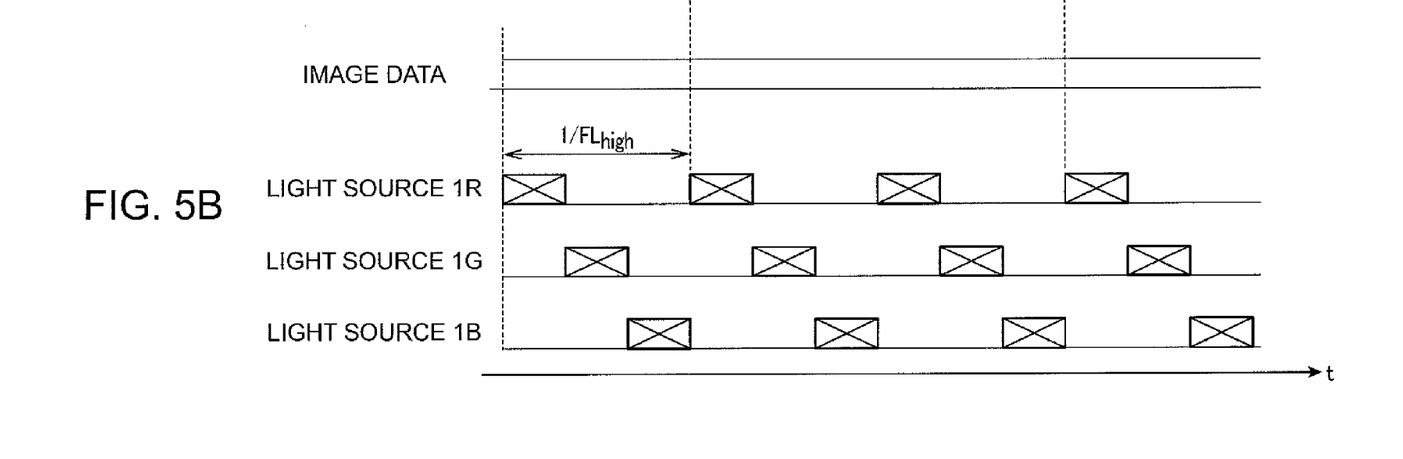
FIG. 5B is a diagram for explaining a high-speed mode.

In FIGS. 5A and 5B, the horizontal axis is a time axis, and FIGS. 5A and 5B show the timings of driving the light sources of the respective colors in relation to the passage of time. FIG. 5A is a diagram for explaining the normal mode, and FIG. 5B is a diagram for explaining the high-speed mode.

Normal Mode

As shown in FIG. 5A, in the RGB sequential drive, namely the color sequential drive, one full-color frame is expressed by three temporally-consecutive field images. In the case in which no double-speed drive is performed, if the frame frequency $F_{frame}$ of the source image is 60 Hz, the RGB cyclic frequency $F_{field}$ of the field image is 60 Hz. Further, in the case of triple-speed drive, if the frame frequency $F_{frame}$ of the source image is 60 Hz, the RGB cyclic frequency $F_{field}$ of the field image becomes 180 Hz. Although in the case of driving the R, G, and B light sources 1R, 1G, and 1B in the normal mode, the R, G, and B LEDs are also repeatedly driven in accordance with the RGB field image, the cyclic frequency $FL_{normal}$ of the R, G, and B light sources 1R, 1G, and 1B on this occasion becomes 60 Hz (180 Hz in the case of the triple-speed drive). In other words, in the normal mode, the RGB cyclic frequency $F_{field}$ of the field image and the cyclic frequency $FL_{normal}$ of the R, G, and B light sources 1R, 1G, and 1B driven in sequence are equal to each other. It should be noted that the number of the element colors and the number of the element light sources can also be larger than three.

High-Speed Mode

As shown in FIG. 5B, the cyclic frequency $FL_{high}$ of the R, G, and B light sources 1R, 1G, and 1B in the case of the high-speed mode is higher than the RGB cyclic frequency $F_{field}$ of the field image having been written in the spatial light modulation device 3 in the case of the normal mode.

In FIG. 5B, the R, G, and B light sources 1R, 1G, and 1B are driven in the high-speed mode, and in addition thereto, the image (image data) used for the illumination projection is written into the spatial light modulation device 3. This image is an image expressed with, for example, a uniform luminance distribution. Further, the image thus written is not required to particularly be refreshed in the spatial light modulation device 3 as shown in FIG. 5B, but can also be refreshed. In the case in which the image is refreshed, the image to be written can be accompanied with a temporal change in the luminance distribution. The refresh timing is preferably synchronized with either of the switching points between the periods in which each of the R, G, and B light sources 1R, 1G, and 1B can be lit since the visual beat is difficult to occur. It should be noted that the lower the refresh frequency, the more preferable. This is because the power consumption becomes lower. Therefore, it is possible to, for example, refresh the image thus written at a frequency lower than the cyclic frequency of the R, G, and B light sources 1R, 1G, and 1B.

It should be noted that in the case in which the spatial light modulation device 3 includes a normally-white (parallel Nicol) liquid crystal light valve, since each of the pixel areas of the spatial light modulation device 3 transmits light even if no image (image data) is written, in this case, it is not required for the display controller 4 to write the image into the spatial light modulation device 3 when the R, G, and B light sources 1R, 1G, and 1B are driven in the high-speed mode.

The color of the light projected in the case of the high-speed mode can be changed by varying the light emission intensity ratio between the R, G, and B light sources 1R, 1G, and 1B. Further, the color of the light can also be changed by varying the pulse width (the width of the lighting period) in the period in which each of the R, G, and B light sources 1R, 1G, and 1B can be lit.

It should be noted that when defining the normal mode and the high-speed mode, the modes can also be expressed simply with high and low in the cyclic frequencies $FL_{normal}$, $FL_{high}$ in the both modes of each of the R, G, and B light sources 1R, 1G, and 1B. The cyclic frequency $FL_{high}$ in the high-speed mode is higher than the cyclic frequency $FL_{normal}$ in the normal mode, and three times as high as the cyclic frequency $FL_{normal}$ in the normal mode in the present embodiment.

As described above, since in the present embodiment, the R, G, and B light sources 1R, 1G, and 1B are driven in the high-speed mode in the case in which the operation mode is the illumination mode, it becomes more difficult to sense the color breakup than in the case of projecting the image related to the content in the content mode. Further, since no overlap exists between the time periods (the periods in which the lighting is possible) in which the R, G, and B light sources 1R, 1G, and 1B can be lit in the case in which the operation mode is the illumination mode, it becomes unnecessary to redundantly provide the same circuit inside the light source drive circuit 25 (FIG. 3), and thus the circuit configuration can be simplified. Further, since the RGB sequential drive is performed similarly to the case of projecting the image related to the content, the drive control can be simplified. In other words, in providing the projector 100 functioning also as the illumination device, increase in cost can be prevented.

Then, an operation of the projector 100 having the configuration described hereinabove will be explained.

Figure 6:
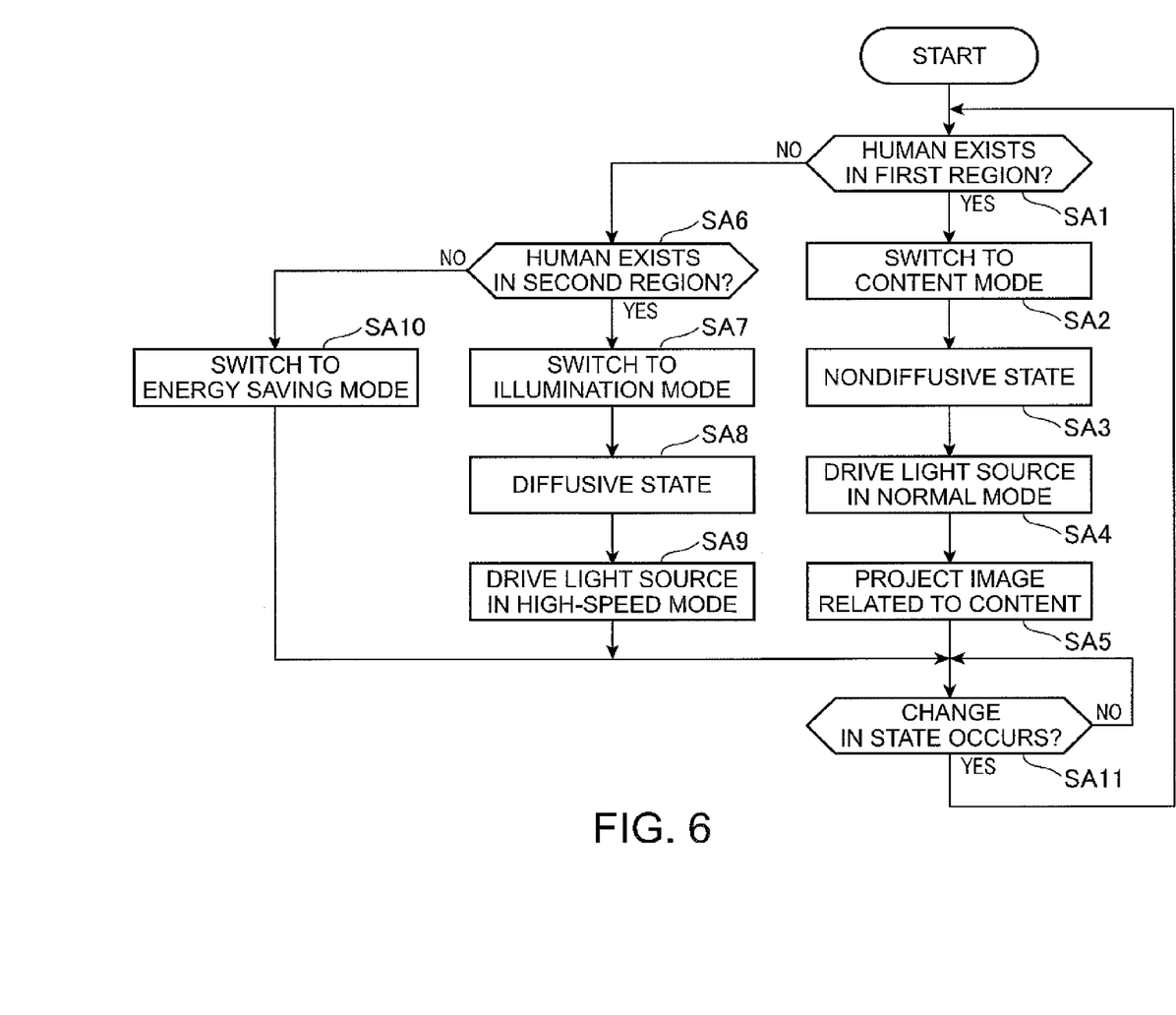
FIG. 6 is a flowchart showing an operation of the projector.

FIG. 6 is a flowchart showing the operation of the projector 100.

In the present embodiment, starting of the process of the flowchart shown in FIG. 6 is triggered by the commencement of the power supply to the projector 100 due to the operation of the switch 54 by the user. Besides the above, it is also possible to adopt a configuration of starting the process in the case in which an explicit instruction is issued by the user.

Further, in the explanation described below, the function of the mode switching section 31 explained hereinafter is realized by hardware and software in cooperation with each other such as the CPU of the control section 23 reading and then executing a program.

When the power is switched ON, the human detection section 30 of the control section 23 of the projector 100 detects (step SA1) whether or not a human exists in the first region A1.

In the case in which a human exists in the first region A1 (YES in the step SA1), the mode switching section 31 of the control section 23 switches (step SA2) the operation mode to the content mode.

As explained in the steps SA3 through SA5, the content mode is a mode of projecting the image related to the content on the screen SC using a method suitable for the image.

As described above, in the present embodiment, in the case in which a human exists in the first region A1 defined based on the viewability of the image projected on the screen SC with the light projected by the projector 100, the mode switching section 31 switches the operation mode to the content mode. Due to this configuration, it results that the image related to the content is projected in the case in which there is a possibility that the image related to the content is visually recognized by the human, and thus, the image related to the content can be prevented from being unnecessarily projected.

When the operation mode is switched to the content mode, the control section 23 controls (step SA3) the light diffusion device 7 so that the light diffusion device 7 is kept in the nondiffusive state. In the present embodiment, it results that the predetermined potential difference fails to be applied between the pair of electrodes sandwiching the reverse-mode PDLC layer. It should be noted that in the case in which the light diffusion device 7 includes the normal PDLC layer, the light diffusion controller 8 controls the light diffusion device 7 so that the potential difference is applied between the pair of electrodes.

Subsequently, the control section 23 starts (step SA4) driving the R, G, and B light sources 1R, 1G, and 1B in the normal mode described above. Here, since the light diffusion device 7 is in the nondiffusive state, the light beams from the R, G, and B light sources 1R, 1G, and 1B are transmitted through the light diffusion device 7 without being substantially diffused. It should be noted that the timing, at which the light sources 1 start lighting, and the timing, at which the light diffusion device 7 becomes not to substantially diffuse the light, can be transposed to each other, or can be equal to each other.

Subsequently, the control section 23 controls related sections to start (step SA5) projection of the image related to the content. Specifically, the control section 23 writes the image into the spatial light modulation device 3 at appropriate timings based on the content data stored in the flash memory provided to the SSD 13, a memory card inserted in the card slot related to the memory card I/O circuit 14, and so on. It should be noted that the control section 23 can also project the image related to the content to the screen SC based on the signal including the video signal input from the external device via the wireless LAN adapter 12. Further, the content data to be used can be one determined in advance, or it is possible to adopt a configuration of making the user select the content data before starting the process.

Through the process described hereinabove, the light beams from the R, G, and B light sources 1R, 1G, and 1B are modulated in accordance with the image written in the spatial light modulation device 3, and then projected by the projection optical system 6. Here, since the light diffusion device 7 is in the nondiffusive state, the light modulated by the spatial light modulation device 3 is transmitted through the light diffusion device 7 without being substantially diffused. As a result, a clear and/or bright image is projected.

The image related to the content is visually recognized by a human, and is therefore required to be clear and bright so as to be eye-friendly for the human. By setting the light diffusion device 7 to the nondiffusive state, and driving the light sources in the normal mode, it is possible to respond to the request described above.

Then, the control section 23 makes the transition of the processing procedure to the step SA11. The process of the step SA11 will be described later.

In contrast, in the case in which no human exists in the first region A1 as a result of the detection by the human detection section 30 (NO in the step SA1), the human detection section 30 detects (step SA6) whether or not a human exists in the second region A2.

In the case in which a human exists in the second region A2 (YES in the step SA6), the mode switching section 31 of the control section 23 switches (step SA7) the operation mode to the illumination mode.

As explained in the description of the steps SA7 through SA9, the illumination mode is a mode for projecting the light for illumination using the projector 100. In other words, the illumination mode is a mode for making the projector 100 function as an illumination device.

As described above, in the present embodiment, in the case in which no human exists in the first region A1, and a human exists in the second region A2, the mode switching section 31 switches the operation mode to the illumination mode. Due to this configuration, while inhibiting the image related to the content from being unnecessarily projected, in the case in which a human can make efficient use of the illumination, the projector 100 can be made to function as the illumination device.

When the operation mode is switched to the illumination mode, the control section 23 controls (step SA8) the light diffusion device 7 so that the light diffusion device 7 is kept in the diffusive state. In the present embodiment, since the light diffusion device 7 includes the reverse-mode PDLC layer, it results that the predetermined potential difference is applied between the pair of electrodes sandwiching the reverse-mode PDLC layer. It should be noted that in the case in which the light diffusion device 7 includes the normal PDLC layer, the light diffusion controller 8 controls the light diffusion device 7 so that no potential difference is applied between the pair of electrodes (on this occasion, nothing must be done, for example). This is because the diffusive state and the nondiffusive state generated in accordance with the presence or absence of the potential difference are opposite between the reverse-mode PDLC layer and the normal PDLC layer.

Subsequently, the control section 23 starts (step SA9) driving the R, G, and B light sources 1R, 1G, and 1B in the high-speed mode described above. It should be noted that the timing, at which the light sources 1 start lighting, and the timing, at which the light diffusion device 7 becomes to diffuse the light, can be transposed to each other, or can be equal to each other.

Due to the process described above, the light beams from the R, G, and B light sources 1R, 1G, and 1B pass through the spatial light modulation device 3 and the projection optical system 6, and are then diffused by the light diffusion device 7. As a result, the light for illumination is projected from the projector 100. In other words, since the light beams from the R, G, and B light sources 1R, 1G, and 1B have already been diffused by the light diffusion device 7, soft light suitable to illuminate the inside of a room or the like is projected by the projector 100. Therefore, the projector 100 functions as the illumination device. In particular, since the projector 100 according to the present embodiment is a device to be attached to the ceiling surface 50, it is possible to suitably function as the illumination device.

Subsequently, the control section 23 makes the transition of the processing procedure to the step SA11. The process of the step SA11 will be described later.

It should be noted that it is also possible to adopt a configuration in which the projector 100 projects an image for illumination in the illumination mode. On this occasion, after the operation mode is switched to the illumination mode, the control section 23 starts writing the image for illumination into the spatial light modulation device 3. The image for illumination is typically an image having a luminance uniform throughout the image, but can also be an image having a luminance relatively higher in the peripheral portion than a luminance in the central portion or an image having a luminance relatively lower in the peripheral portion than a luminance in the central portion. The image data of the image for illumination is stored in the flash memory of the SSD 13 or the like in advance. It results that the spatial light modulation device 3 modulates the light beams from the R, G, and B light sources 1R, 1G, and 1B in accordance with the image thus written therein. It should be noted that since the spatial light modulation device 3 evenly transmits the light in the case in which the spatial light modulation device 3 includes the normally-white (parallel Nicol) liquid crystal light valve even if no image is written, in such a case, the control section 23 is not required to write an image into the spatial light modulation device 3.

In contrast, in the case in which no human exists in the second region A2 as a result of the detection by the human detection section 30 in the step SA6, namely in the case in which no human exists in both of the first region A1 and the second region A2 (NO in the step SA6), the mode switching section 31 switches (step SA10) the operation mode to an energy saving mode.

In the energy saving mode, at least the drive of the R, G, and B light sources 1R, 1G, and 1B is stopped, and the projection of the light is not performed. Thus, in the case in which no human exists in the region where the image related to the content thus projected can visually be recognized, and at the same time, no human exists in the region where the light projected by the projector can be used as illumination, the light projection can be inhibited from being unnecessarily performed, and thus the energy saving can be realized.

It should be noted that it is obvious that in the energy saving mode, a process for realizing another type of energy saving such as the transition to a so-called sleep state can also be performed.

Subsequently, the control section 23 makes the transition of the processing procedure to the step SA11.

In the step SA11, the control section 23 monitors whether or not a change occurs in the relationship between the regions and humans. The change in the relationship between the regions and humans denotes a change in the detection result of the human detection section 30 such as a change from the state in which a human exists only in the first region A1 to the state in which a human exists also in the second region A2, or a change from the state in which no human exists in either of the regions to the state in which a human exists in either one of the regions.

The process in the step SA11 is performed in such a manner as described below. Specifically, the control section 23 obtains the detection result of the human detection section 30 at a predetermined sampling period, and monitors whether or not the detection result changes to thereby monitor whether or not a change occurs in the relationship between the regions and humans.

In the case in which a change occurs in the relationship between the regions and humans, the control section 23 returns the processing procedure to the step SA1 to start the process related to the switching of the operation mode.

As explained hereinabove, in the present embodiment, the mode switching section 31 of the control section 23 of the projector 100 switches the operation mode to the content mode in the case in which a human is detected in the first region A1 by the human detection section 30, or switches the operation mode to the illumination mode in the case in which no human is detected.

According to this configuration, it becomes possible for the projector 100 to project the image related to the content only in the case in which a human exists in the predetermined region, and thus it is possible to inhibit the image related to the content from being unnecessarily projected.

Further, according to the present embodiment, the human detection section 30 is capable of detecting a human existing in each of the plurality of regions, and the mode switching section 31 switches the operation mode to the content mode or the illumination mode in accordance with the relationship between the states of whether or not a human exists in the respective regions.

More specifically, the mode switching section 31 switches the operation mode to the content mode in the case in which the human detection section 30 detects the fact that a human exists in the first region A1, or switches the operation mode to the illumination mode in the case in which the human detection section 30 fails to detect the fact that a human exists in the first region A1 and at the same time the human detection section 30 detects the fact that a human exists in the second region A2.

According to this configuration, it is possible to appropriately switch the operation mode in accordance with whether or not a human exists in the region where the image related to the content projected thereon can visually be recognized. Further, in the case in which no human exists in the region where the image related to the content thus projected can visually be recognized, the operation mode can appropriately be switched in accordance with whether or not a human exists in the region where the light projected by the projector can be used as illumination.

Further, in the present embodiment, in the case in which it is not detected that a human exists in the first region A1 and the second region A2, the mode switching section 31 makes the transition of the operation mode to the energy saving mode to stop the projection of the light by the projection section.

According to this configuration, since the projection of the light is stopped in the case in which no human exists in the region where the image related to the content thus projected can visually be recognized, and at the same time, no human exists in the region where the light projected by the projector can be used as illumination, the light projection can be inhibited from being unnecessarily performed, and thus the energy saving can be realized.

Further, the projector 100 according to the present embodiment is provided with the light diffusion device 7, and transmits the light from the light sources without being diffused by the light diffusion device 7 in the case in which the operation mode is the content mode, and transmits the light from the light sources while being diffused by the light diffusion device in the case in which the operation mode is the illumination mode.

According to this configuration, in the case in which the operation mode is the illumination mode, it is possible to project the light suitable for the illumination light using the light diffusion device.

It should be noted that the embodiment described above is only for showing an aspect of the invention, and can arbitrarily be modified or applied within the scope of the invention.

In the embodiment described above, the human detection section 30 has the configuration of detecting the existence of a human in two regions, namely the first region A1 and the second region A2, and the mode switching section 31 has the configuration of switching the operation mode in accordance with the relationship between the states of whether or not a human exists in the respective regions.

However, it is also possible to adopt a configuration in which the human detection section 30 detects the existence of a human in one region, and the mode switching section 31 switches the operation mode in accordance with whether or not a human exists in the one region. In this case, if it is arranged that the one region corresponds to the first region A1, and the mode switching section 31 switches the operation mode to the content mode in the case in which a human exists in the one region, and switches the operation mode to the illumination mode in the case in which no human exists in the one region, it is possible to obtain substantially the same advantage as the advantage described above in the explanation of the embodiment with respect to the projection of the image related to the content.

Further, it is also possible to adopt a configuration in which the human detection section 30 detects whether or not a human exists in each of three or more regions, and the mode switching section 31 switches the operation mode in accordance with the relationship between the states of whether or not a human exists in the respective regions. According to this configuration, in the case in which, for example, the region where the content can visually be recognized is separated into two or more regions, effective switching of the operation mode can be realized.

Further, each of the functional sections of the projector 100 shown in FIGS. 2 and 3 is for showing the functional configuration realized by the cooperation of hardware and software, and the specific mounting configuration is not particularly limited. Therefore, it is not necessarily required to install the hardware corresponding individually to each of the functional sections, but it is obviously possible to adopt a configuration of realizing the functions of the plurality of functional sections by one processor executing a program. Further, a part of the function realized by software in the embodiment described above can also be realized by hardware, or a part of the function realized by hardware can also be realized by software. Besides the above, the specific detailed configuration of each of other sections of the projector 100 can arbitrarily be modified within the scope or the spirit of the invention.

What is claimed is:

1. A projector comprising:
a projection section adapted to project light;
a human detection section adapted to detect a human existing in a predetermined region; and
a mode switching section adapted to switch an operation mode to one of a content mode for projecting light of an image related to a content by the projection section, and an illumination mode for projecting light for illumination by the projection section in accordance with a detection result of the human detection section, wherein
the mode switching section switches the operation mode to the content mode in a case in which a human is detected by the human detection section, and switches the operation mode to the illumination mode in a case in which no human is detected.

2. The projector according to claim 1, wherein
the predetermined region is a region defined based on visibility of an image to be projected using the light projected in a case in which the operation mode is the content mode.

3. The projector according to claim 1, wherein
the human detection section is capable of detecting a human existing in the region with respect to each of a plurality of regions, and
the mode switching section switches the operation mode to one of the content mode and the illumination mode in accordance with a relationship between states of whether or not a human exists in the respective regions.

4. The projector according to claim 3, wherein
a first region included in the plurality of regions is a region defined based on visibility of an image to be projected using the light projected in a case in which the operation mode is the content mode,
a second region included in the plurality of regions is a region defined based on availability of the projected light as illumination in a case in which the operation mode is the illumination mode, and
the mode switching section
switches the operation mode to the content mode in a case in which the human detection section has detected that a human exists in the first region, and
switches the operation mode to the illumination mode in a case in which the human detection section has failed to detect that a human exists in the first region, and has detected that a human exists in the second region.

5. The projector according to claim 4, wherein
the projection of the light by the projection section is stopped unless it is detected that a human exists in at least one of the first region and the second region.

6. The projector according to claim 1, further comprising:
a light source; and
a light diffusion device disposed on a light path from the light source,
wherein the light from the light source is transmitted without being diffused by the light diffusion device in a case in which the operation mode is the content mode, and
the light from the light source is transmitted while being diffused by the light diffusion device in a case in which the operation mode is the illumination mode.

7. A method of controlling a projector including a projection section adapted to project light, the method comprising:
detecting a human existing in a predetermined region; and
switching an operation mode to a content mode for projecting light of an image related to a content by the projection section, in a case in which a human is detected by the human detection step, or to an illumination mode for projecting light for illumination by the projection section in accordance with a detection result in the detecting, in a case in which no human is detected.

8. A projector comprising:
a projection section adapted to project light;
a human detection section adapted to detect a human existing in a predetermined region; and
a mode switching section adapted to switch an operation mode to one of a content mode for projecting light of an image related to a content by the projection section, and an illumination mode for projecting light for illumination by the projection section in accordance with a detection result of the human detection section,
wherein the human detection section is capable of detecting a human existing in the region with respect to each of a plurality of regions, and
the mode switching section switches the operation mode to one of the content mode and the illumination mode in accordance with a relationship between states of whether or not a human exists in the respective regions.

9. A projector comprising:
a projection section adapted to project light;
a human detection section adapted to detect a human existing in a predetermined region;
a mode switching section adapted to switch an operation mode to one of a content mode for projecting light of an image related to a content by the projection section, and an illumination mode for projecting light for illumination by the projection section in accordance with a detection result of the human detection section;
a light source; and
a light diffusion device disposed on a light path from the light source,
wherein the light from the light source is transmitted without being diffused by the light diffusion device in a case in which the operation mode is the content mode, and
the light from the light source is transmitted while being diffused by the light diffusion device in a case in which the operation mode is the illumination mode.

* * * * *